US012754942B2

(12) United States Patent
Shi et al.

(10) Patent No.: US 12,754,942 B2
(45) Date of Patent: Oct. 6, 2026

(54) DOCUMENT PROCESSING AND RETRIEVAL FOR KNOWLEDGE-BASED QUESTION ANSWERING

(71) Applicant: Oracle International Corporation, Redwood Shores, CA (US)

(72) Inventors: Yingqiong Shi, Redwood City, CA (US); Charles Woodrow Dickstein, New York, NY (US); Aashna Devang Kanuga, Foster City, CA (US); Xu Zhong, Melbourne (AU); Xin Xu, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/885,071

(22) Filed: Sep. 13, 2024

(65) Prior Publication Data

US 2025/0094480 A1 Mar. 20, 2025

Related U.S. Application Data

(60) Provisional application No. 63/538,747, filed on Sep. 15, 2023.

(51) Int. Cl.
*G06F 16/334* (2025.01)
*G06F 16/31* (2019.01)
(Continued)

(52) U.S. Cl.
CPC .......... *G06F 16/334* (2019.01); *G06F 16/316* (2019.01); *G06F 16/3344* (2019.01);
(Continued)

(58) Field of Classification Search
CPC .. G06F 16/334; G06F 16/316; G06F 16/3344; G06F 16/383; G06F 40/40; G06F 40/289; G06F 40/205
See application file for complete search history.

(56) References Cited

U.S. PATENT DOCUMENTS

| | | | |
|---|---|---|---|
| 10,430,445 | B2 | 10/2019 | Crouch et al. |
| 10,997,221 | B2 | 5/2021 | Chakraborty et al. |

(Continued)

FOREIGN PATENT DOCUMENTS

| | | | |
|---|---|---|---|
| CN | 116340467 | A | 6/2023 |
| EP | 3910493 | A1 | 11/2021 |

OTHER PUBLICATIONS

U.S. Appl. No. 18/885,060 , Non-Final Office Action, mailed on Jun. 17, 2025, 8 pages.

(Continued)

*Primary Examiner* — Marc S Somers
(74) *Attorney, Agent, or Firm* — Kilpatrick Townsend & Stockton LLP

(57) ABSTRACT

Techniques are disclosed herein for generating and using a knowledge base of information extracted from documents. The techniques include accessing a document comprising text and dividing the document into a plurality of chunks of text. The chunks are indexed by storing each chunk mapped to respective identifying metadata including a chunk index for each chunk. A query is received and a chunk relevant to the query is identified. A prompt is formulated including the query, the identified relevant chunk, and a subsequent chunk. The prompt is provided to a language model and output is received from the language model based on the prompt. An answer to the query is returned based on the received output.

20 Claims, 11 Drawing Sheets

(51) Int. Cl.

| | |
|---|---|
| ***G06F 16/383*** | (2019.01) |
| ***G06F 40/289*** | (2020.01) |
| ***G06F 40/40*** | (2020.01) |
| *G06F 40/205* | (2020.01) |

(52) U.S. Cl.
CPC .......... *G06F 16/383* (2019.01); *G06F 40/289* (2020.01); *G06F 40/40* (2020.01); *G06F 40/205* (2020.01)

(56) References Cited

U.S. PATENT DOCUMENTS 11,074,284 B2 7/2021 Cunico et al.
11,429,652 B2 8/2022 Alkan et al.
11,741,139 B2 8/2023 Zhuo et al.
12,505,136 B2 12/2025 Khosla et al.
12,566,785 B2 3/2026 Zhong et al.
2005/0165753 A1* 7/2005 Chen .................. G06F 16/9535
2008/0189247 A1* 8/2008 Blinnikka ............ G06F 16/951
2011/0282651 A1* 11/2011 Nygaard .............. G06F 16/345 704/9
2015/0169734 A1* 6/2015 Jain ...................... G06F 16/335 707/742
2016/0078038 A1* 3/2016 Solanki ................ G06F 16/345 707/727
2016/0078102 A1* 3/2016 Crouch ................ G06F 16/313 707/722
2016/0340296 A1 11/2016 Brazdil et al.
2019/0311064 A1* 10/2019 Chakraborty ..... G06F 16/90332
2020/0380077 A1 12/2020 Ge et al.
2020/0395017 A1 12/2020 Siddoway et al.
2021/0097097 A1 4/2021 Alkan et al.
2021/0133264 A1* 5/2021 Tiwari .................... H04L 51/02
2021/0374346 A1 12/2021 Malur Srinivasan et al.
2022/0405484 A1* 12/2022 Kanchibhotla ........ G06N 5/022
2023/0267267 A1* 8/2023 Sukla .................... G06F 40/131 706/46
2024/0061832 A1 2/2024 Hoang et al.
2024/0320251 A1* 9/2024 Hemington ........... G06F 16/338
2024/0403341 A1 12/2024 Berglund et al.
2025/0005058 A1* 1/2025 Khosla ................ G06F 16/3344
2025/0061118 A1* 2/2025 Debnath ................ G06N 3/092
2025/0190455 A1 6/2025 Raimondo

OTHER PUBLICATIONS

U.S. Appl. No. 18/885,347, Non-Final Office Action, mailed on Mar. 30, 2026, 16 pages.
U.S. Appl. No. 18/885,356, Non-Final Office Action, mailed on Apr. 1, 2026, 17 pages.
U.S. Appl. No. 18/885,060, "Notice of Allowance", mailed on Nov. 25, 2025, 10 pages.

* cited by examiner

DOCUMENT PROCESSING AND RETRIEVAL FOR KNOWLEDGE-BASED QUESTION ANSWERING

CROSS-REFERENCES TO RELATED APPLICATIONS

The present application is a non-provisional application of and claims the benefit and priority under 35 U.S.C. 119(e) of U.S. Provisional Application No. 63/538,747, filed Sep. 15, 2023 entitled "KNOWLEDGE DIALOGS," the entire contents of which is incorporated herein by reference for all purposes.

FIELD

The present disclosure relates generally to language processing, and more particularly, to techniques for ingesting and retrieving knowledge data for processing by a language model.

BACKGROUND

Artificial intelligence has many applications. To illustrate, many users around the world are on instant messaging or chat platforms in order to get instant reactions. Organizations often use these instant messaging or chat platforms to engage with customers (or end users) in live conversations. However, it can be very costly for organizations to employ service people to engage in live communication with customers or end users. Chatbots or bots have been developed to simulate conversations with end users, especially over the Internet. End users can communicate with bots through messaging apps that the end users have already installed and used, or through other kinds of applications in which messaging has been enabled. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

BRIEF SUMMARY

In various embodiments, a computer-implemented method is provided that includes: accessing, by a computing system, a document, the document comprising text; dividing, by the computing system, the document into a plurality of chunks of text; indexing, by the computing system, the plurality of chunks, the indexing comprising storing each chunk mapped to respective identifying metadata, the identifying metadata including a chunk index for each chunk; receiving, by the computing system, a query; identifying, by the computing system, a chunk relevant to the query; formulating, by the computing system, a prompt including the query, the identified relevant chunk, and a subsequent chunk with a subsequent chunk index immediately following a chunk index of the identified relevant chunk; providing, by the computing system, the prompt to a language model; receiving, by the computing system from the language model, output based on the prompt; and returning, by the computing system, an answer to the query based on the received output.

In some aspects, identifying the chunk relevant to the query comprises: embedding, by the computing system, a plurality of indexed chunks; embedding, by the computing system, the query; comparing, by the computing system, each of the plurality of chunk embeddings to the query embedding to generate a similarity score for each chunk embedding; and selecting the chunk with a highest similarity score. In some aspects, comparing the plurality of chunk embeddings to the query embedding comprises computing the similarity score for each chunk embedding based on cosine similarity.

In some aspects, the method further includes identifying, by the computing system, a file type of the document; and dividing the document into the plurality of chunks according to the file type. In some aspects, the file type is portable document format (PDF) and the dividing the document into the plurality of chunks comprises parsing the document into multiple sentence objects and storing a chunk for each of the sentence objects. In some aspects, the file type is comma-separated values (CSV) comprising rows, columns, and cells, and the dividing the document into the plurality of chunks comprises appending a column header to each cell and converting each row to a chunk In some aspects, the method further includes identifying a size limit of a context input section for the language model; comparing a size of the chunk and the subsequent chunk to the size limit; and resizing the size of the chunk and the subsequent chunk to be less than or equal to the size limit.

In various embodiments, a system is provided that includes one or more processors and one or more computer-readable media storing instructions which, when executed by the one or more processors, cause the system to perform part or all of one or more methods disclosed herein.

In various embodiments, one or more non-transitory computer-readable media are provided for storing instructions which, when executed by one or more processors, cause a system to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
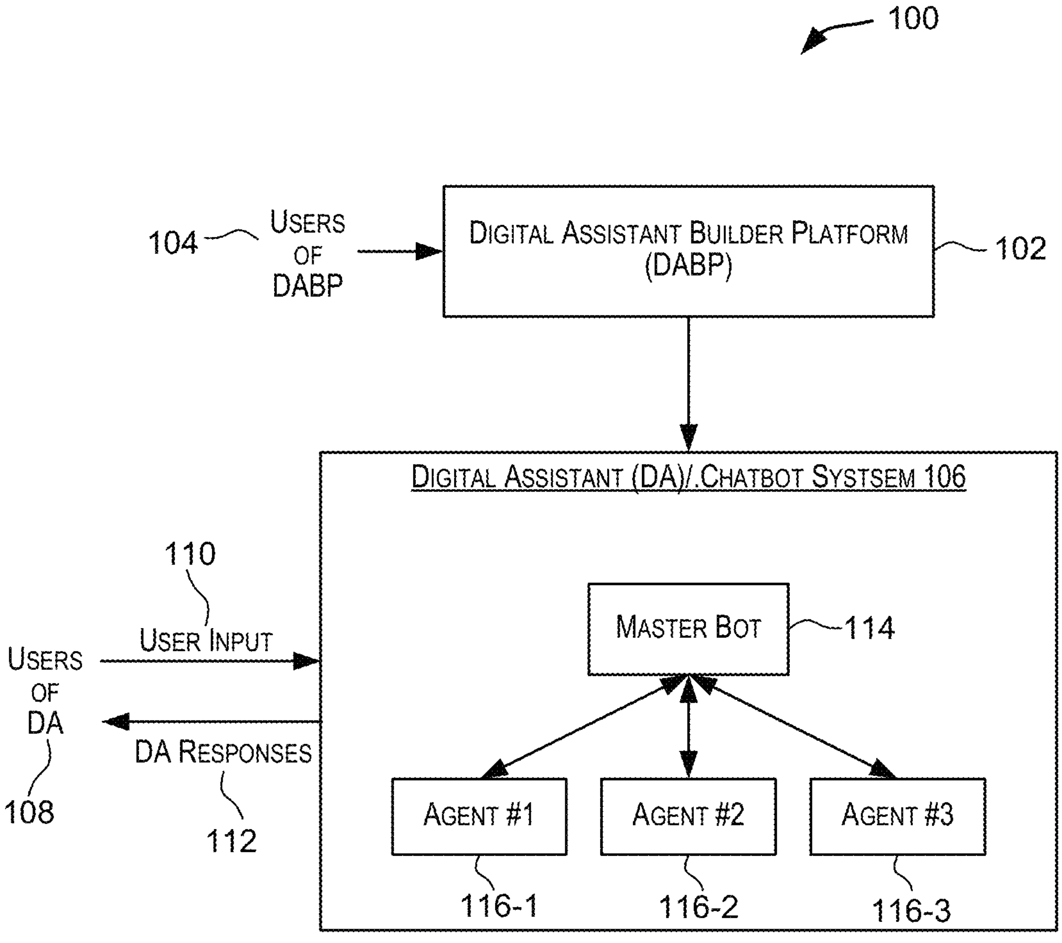
FIG. 1 is a simplified block diagram of a distributed environment incorporating a chatbot system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Artificial intelligence techniques have broad applicability. For example, a digital assistant is an artificial intelligence driven interface that helps users accomplish a variety of tasks using natural language conversations. Conventionally, for each digital assistant, a customer may assemble one or more skills that are focused on specific types of tasks, such as tracking inventory, submitting timecards, and creating expense reports. When an end user engages with the digital assistant, the digital assistant evaluates the end user input for the intent of the user and routes the conversation to and from the appropriate skill based on the user's perceived intent. However, there are some disadvantages of traditional intent-based skills including a limited understanding of natural language, inability to handle unknown inputs, limited ability to hold natural conversations off script, and challenges integrating external knowledge.

The advent of large language models (LLMs) like GPT-4 has propelled the field of chatbot design to unprecedented levels of sophistication and overcome these disadvantages and others of traditional intent-based skills. An LLM is a neural network that employs a transformer architecture, specifically crafted for processing and generating sequential data, such as text or words in conversations. LLMs undergo training with extensive textual data, gradually honing their ability to generate text that closely mimics human-written or spoken language. While LLMs excel at predicting the next word in a sequence, it's important to note that their output isn't guaranteed to be entirely accurate. Their text generation relies on learned patterns and information from training data, which could be incomplete, erroneous, or outdated, as their knowledge is confined to their training dataset. LLMs don't possess the capability to recall facts from memory; instead, their focus is on generating text that appears contextually appropriate.

To address this limitation, LLMs can be enhanced with tools that grant them access to external knowledge sources and training them to understand and respond to user queries in a contextually relevant manner. This enhancement can be achieved through various means including knowledge graphs, custom knowledge bases, Application Programming Interfaces (APIs), web crawling or scraping, and the like. The enhanced LLMs are commonly referred to as "agents." Once configured, the agent can be deployed in artificial intelligence base systems such as chatbot applications. Users interact with the chatbot, posing questions or making requests, and the agent generates responses based on a combination of its base LLM capabilities and access to the external knowledge. This combination of powerful language generation with access to real-time information allows chatbots to provide more accurate, relevant, and contextually appropriate responses across a wide range of applications and domains.

For each digital assistant, a user may assemble one or more agents. Agents (which comprise, at least in part, one or more Large Language Models (LLMs)) are individual bots that provide human-like conversation capabilities for various types of tasks, such as tracking inventory, submitting timecards, updating accounts, and creating expense reports. The agents are primarily defined using natural language. Users (e.g., developers) can create a functional agent by pointing the agent to assets such as Application Programming Interfaces (APIs), knowledge-based assets such as documents, URLs, images, etc., data stores, prior conversations, etc. The assets are imported to the agent, and then, because the agent is LLM-based, the user can customize the agent using natural language again to provide additional API customizations for dialog and routing/reasoning. The operations performed by an agent are realized via execution of one or more actions. An action can be an explicit one that's authored (e.g., action created for generating natural language text or audio response in reply to an authored natural language prompt such as the query—'What is the impact of XYZ on my 401k Contribution limit?') or an implicit one that is created when an asset is imported (e.g., actions created for Change Contribution and Get Contribution API, available through a API asset, configured to change a user's 401k contribution).

When an end user engages with the digital assistant, the digital assistant evaluates the end user input and routes the conversation to and from the appropriate agents. The digital assistant can be made available to end users through a variety of channels such as FACEBOOK® Messenger, SKYPE MOBILE® messenger, or a Short Message Service (SMS), as well as via an application interface that has been developed to include a digital assistant, e.g., using a digital assistant software development kit (SDK). Channels carry the chat back and forth from end users to the digital assistant and its various agents. During these back-and-forth exchanges, the selected agent receives the processed input in the form of a query and processes the query to generate a response. This is done by an LLM of the agent predicting the most contextually relevant and grammatically correct response based on its training data and the input (e.g., the query and configuration data) it receives. The generated response may undergo post-processing to ensure it adheres to guidelines, policies, and formatting standards. This step helps make the response more coherent and user-friendly. The final response is delivered to the user through the appropriate channel, whether it's a text-based chat interface, a voice-based system, or another medium. According to various embodiments, the digital assistant maintains the conversation context, allowing for further interactions and dynamic back-and-forth exchanges between the user and the agent where later interactions can build upon earlier interactions.

A key use case for digital assistants is to provide information. There are customer service deployments that are purely informational instead of being transactional. Recent development of LLMs such as ChatGPT, Bard, etc., has demonstrated their ability to answer questions and provide information based on documents or data entered by the user. They also can engage user in complex multi-turn conversations.

In contrast to the LLMs, skills generally provide information through Answer Intents which developers created manually in skill's Intents or automatically via Doc2QnA. These features allow the developer to review and curate the Answer Intents before their deployment but nonetheless requires additional work from the developer beyond simply uploading the knowledge documents. This approach works well when a customer's knowledge repository is small. However, when the knowledge repository contains many documents, the current approach is no longer manageable. These features also do not provide the ability to let the digital engage in a natural, fluid conversation with user.

A C2Knowledge Service is provided to centralize ingestion, storage, indexing, and query on knowledge base documents. A developer can provide documents to add to the knowledge service, which are processed to facilitate using these documents to answer questions in a natural language dialog. The developer can simply upload the knowledge documents and the knowledge dialog ingestion pipeline chunks and analyzes the data for integration into its knowledge base. At runtime, the knowledge base is leveraged along with an LLM to provide information in a natural conversation with the user.

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Computing Environment for Query Processing

A bot (also referred to as an agent, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) or API call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined or pre-processed for input to a bot that is identified to be associated with the invocation name and/or communication.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances (also referred to as prompts, queries, requests, and the like). A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which may involve identifying the goal of the user, one or more intents of the user, and one or more entities corresponding to the utterance. Upon understanding the meaning of an utterance, digital assistant 106 may generate an execution plan that identifies the bot or agent to execute and perform one or more actions or operations responsive to the understood meaning or goal of the user. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning or goal of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG) using one or more Large Language Models (LLMs). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining one or more actions to be performed in response to the utterance, where appropriate causing the one or more actions to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more agents. In certain embodiments, these agents are individual chatbots (LLMs enhanced with tools that grant them access to various knowledge sources) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes agents 116-1, 116-2, and so on. For purposes of this disclosure, the terms "agents" are used synonymously with the terms "bot" and "chatbots," respectively.

Each agent associated with a digital assistant helps a user of the digital assistant complete a task through a conversation with the user, where the conversation can include a combination of text or audio inputs provided by the user and responses provided by the agents. These responses may be in the form of text or audio messages to the user and/or using simple user interface elements (e.g., select lists) that are presented to the user for the user to make selections.

There are various ways in which an agent can be associated or added to a digital assistant. In some instances, an agent can be developed by an enterprise and then added to a digital assistant using DABP 102. In other instances, an agent can be developed and created using DABP 102 and then added to a digital assistant created using DABP 102. In yet other instances, DABP 102 provides an online digital store (referred to as an "agent store") that offers multiple agents directed to a wide range of tasks and actions. The agents offered through the agent store may also expose various cloud services. In order to add an agent to a digital assistant being generated using DABP 102, a user of DABP 102 can access assets via DABP 102, select specific assets for an agent, initiate a few mock chat conversations with the agent, and indicate that the agent is to be added to the digital assistant created using DABP 102.

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are agents. For example, in the embodiment depicted in FIG. 1, digital assistant 106 comprises a master bot 114 and agents 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple agents through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate agent for handling the user request and routes the conversation to the selected agent. This enables a user to converse with the digital assistant through a common single interface and still provide the capability to use several agents configured to perform specific tasks or actions. For example, for a digital assistance developed for an enterprise, the master bot of the digital assistant may interface with agents with specific functionalities, such as a CRM agent for performing functions related to customer relationship management (CRM), an ERP agent for performing functions related to enterprise resource planning (ERP), an HCM agent for performing functions related to human capital management (HCM), etc. This way the end user or consumer of the digital assistant need only know how to access the digital assistant through the common master bot interface and behind the scenes multiple agents are provided for handling the user request.

In certain embodiments, in a master bot/child bot infrastructure, the master bot is configured to be aware of the available list of agents. The master bot may have access to metadata that identifies the various available agents or actions, and for each agent, the capabilities of the agent including the task or actions that can be performed by the agent. Upon receiving a user request in the form of an utterance, the master bot is configured to, from the multiple available agents, identify or predict a specific agent that can best serve or handle the user request. The master bot then routes the utterance (or a portion of the utterance) to that specific agent for further handling. Control thus flows from the master bot to the agents. The master bot can support multiple input and output channels. In certain embodiments, routing may be performed with the aid of processing performed by one or more available agents. For example, at a very high level, the digital assistant is aware of the end-user goal (e.g., Change 401k Contribution). The utterance processing involves an input pipeline that takes the user input, routes the utterance (or a portion of the utterance) to the specific agent for handling, and creates an execution plan comprised of one or more actions that is to be executed by an execution engine. A context and memory store is leveraged during this processing for efficient retrieval and storage of assets, context, and memory to create the execution plan. The execution engine then executes the one or more actions to obtain various results of the one or more actions. An output pipeline synthesizes a response to send to the user based on these various results. The response is generated by an LLM based, at least in part, on configuration information and the prompt that identifies the end-user goal. The execution plan may be updated during the processing. For example, the execution plan may be updated to be useful for autonomous agents (e.g., a first iteration of a plan for a set of one or more prompts from an end user might be to book a particular hotel using one or more particular API calls, but after executing one or more of the API calls it is determined that all rooms in the hotel that satisfy the determined requirements from the one or more prompts are booked, and the plan needs to be revised to create a second iteration of the plan).

While the embodiment in FIG. 1 shows digital assistant 106 comprising a master bot 114 and agents 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

Figure 2:
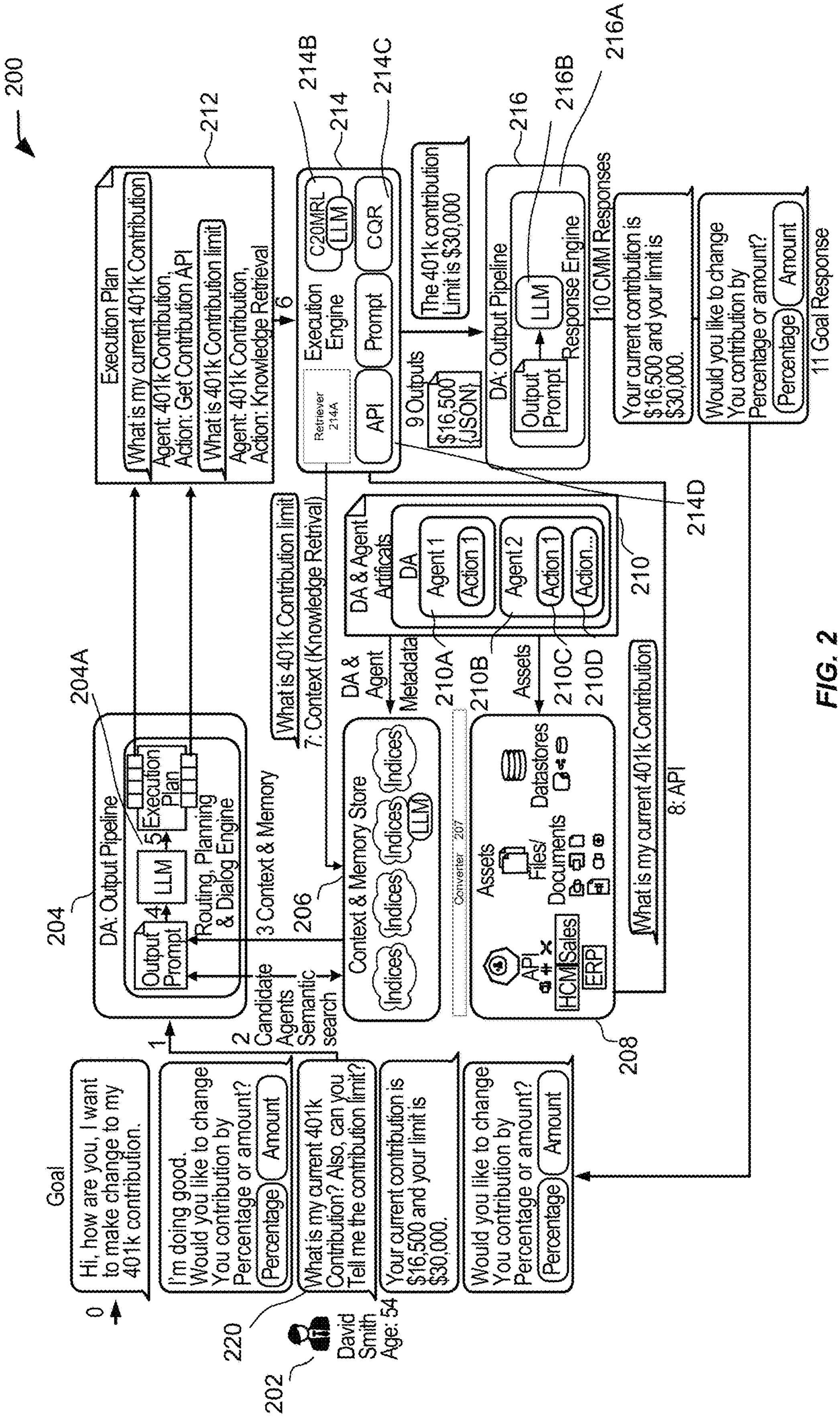
FIG. 2 is an example architecture for an LLM-based digital assistant in accordance with various embodiments.

FIG. 2 shows a computing system 200 and various services and features that enable a user of a digital assistant (e.g., digital assistant 106 described with respect to FIG. 1) to interact with the digital assistant based on a series of prompts (e.g., a conversation). The following is a detailed walkthrough of a conversation flow and the role and responsibility of the main components of the infrastructure and various services. In some implementations, the services of FIG. 2 can be provided as a cloud computing service such as an infrastructure as a service (IaaS).

As shown in FIG. 2, the computing system 200 includes a user 202 ("David Smith"), a digital assistant (DA) input pipeline 204, a context and memory store 206, a converter 207, assets 208, an execution engine 214, and an output pipeline 216. The computing system 200 pictured in FIG. 2 includes multiple large language models (LLMs), including a planning LLM 204A, a conversation to meaning representation language (C2OMRL) LLM 214B, a CQR model 214C, and a response LLM 216B. Each LLM is pretrained to perform its respective task.

The assets 208 can include data stores, files, documents, and/or external databases accessible via API. These assets form a knowledge base for question answering tasks performed by the computing system 200. The converter 207 converts documents, which may be user-provided for customization, into chunks and creates document objects. This may involve embedding the chunks and preparing associated metadata. The embedded document chunks can be stored in association with metadata specifying information such as chunk index, source document, related subject or domain, and the like. The relevant document chunks can then be retrieved by the retriever 214A as needed to provide relevant information to the response LLM 216B without overwhelming it with the entire document.

In this walkthrough, the user 202 is in the middle of making a change to his 401k contribution (as initiated with an initial prompt at step 0). In a subsequent prompt 220 (also referred to as a "request" herein), the user 202 asks the following questions of the digital assistant: What is my current 401k Contribution?Also, can you tell me the contribution limit?

The request (input prompt 220) is sent to the DA input pipeline 204 at step 1. The goal of the DA input pipeline is to create an execution plan 212 that identifies, from DA and agent artifacts 210, one or more agents (e.g., 210A, 210B, etc.) to address the request and one or more actions (e.g., 210C, 210D, etc.) for the one or more agents (e.g., 210A, 210B) to execute for responding to the request.

A two-step approach is taken to create the execution plan 212. The first step is a semantic search at step 2, where the request is sent to the context and memory store 206 that retrieves a list of candidate agents (e.g., 210A, 210B) using the semantic search. The semantic search is performed using words from the request 220 to search for matching words in the digital assistant and agent metadata, and descriptions or metadata of all assets that are indexed in the context and memory store to identify corresponding agents and assets. The index can provide rich and efficient retrieval mechanisms over data from various sources (files/documents, datastores, APIs). This data will be both external (e.g., enterprise assets) and internal (user preferences, memory, digital assistant, and agent metadata, etc.). The context and memory store may have a connector architecture to enable enterprises to plug in custom data sources.

The second step is to create the execution plan 212 based on at least the request 220 and/or list of candidate agents (e.g., 210A, 210B). The execution plan can be generated using the planning LLM 204A and, according to various embodiments, in-context learning capability. This process for creating the execution plan 212 includes:

1. Gathering all the data needed for responding to the request from the context and memory store 206. This typically involves gathering relevant digital assistant and agent metadata, user session, dialog state, contextual history, and user information.
2. Feeding the request and gathered data to the planning LLM 204A at step 4. The planning LLM 204A outputs the execution plan 212 at step 5. The execution plan 212 identifies the one or more agents and one or more actions that need to be executed for responding to the request.
3. The execution plan 212 is then sent to the execution engine 214 at step 6.

The execution engine 214 includes a retriever 214A and an API 214D. The retriever 214A performs knowledge retrieval at step 7 to obtain appropriate contextual knowledge from the context and memory store 206. In some instances, the retriever 214A is configured to identify and retrieve chunks that are similar to the query. Alternatively, or additionally, the retriever 214A is configured to rank the indexed chunks and select some number of highest-ranked chunks to be retrieved. In some instances, the API 214D interfaces with the assets 208 to retrieve other contextual information at step 8.

In some aspects, the execution engine 214 further includes the C2OMRL LLM 214B. The C2OMRL LLM 214B is an LLM trained for converting a natural language utterance to an intermediate database query representation, as described in U.S. patent application Ser. No. 18/209,844, which is incorporated by reference in its entirety. An intermediate database query representation can be adapted to query various types of database for additional knowledge retrieval.

The execution of actions may involve additional internal task mapping. For example, the query "What is my 401k contribution limit?" is mapped to a "semantic search" knowledge task type. A request such as "Can you summarize the key points relating to 401k contribution?" is a "summary" knowledge task type that may be mapped a different index for executing different action for obtaining data and then creating the response. Over time, a library of generic end-user task or action types (semantic search, summarization, compare/contrast, heterogeneous data synthesis, etc.) may be built to ensure that the indices and models are optimized to the various task or action types. These can be stored as DA & agent artifacts and utilized for efficient processing.

In some implementations, the execution engine 214 further includes a CQR model 214C. The CQR model 214C can generate a modified query enriched with contextual information from previous input in a dialog session. The CQR model 214C can be a language model such as an LLM. In some implementations, the CQR model 214C is a specialized version of the Mistral-7B-v0.1 LLM. Based on the original or rewritten query, the execution engine 214 generates a prompt. The prompt may include data from various sources (knowledge, API, dialog history, etc.) and relevant information from the context and memory store 206.

At step 9, the prompt is sent to the output pipeline 216. The main role of the output pipeline 216 is to synthesize responses for providing to the user 202. These responses may be in the format of a Conversation Message Model (CMM) and output by the response LLM 216B as rich multi-modal responses. For example, a prompt is generated based on the knowledge and conversational data and provided to the response LLM 216B. The response LLM is a language model such as ChatGPT (e.g., GPT-4), Falcon 40B Instruct, Cohere Command, or the like that is configured to answer a query based on corresponding knowledge information. The response LLM 216B generates output which may be provided directly to the user 202, or further processed by the response engine to package an appropriate reply. For example, the response engine can add reference information citing associate documents, rephrase the response, and so forth. The responses are output to the user at step 10.

Advantageously, the LLM-based digital assistant eliminates the need for scripted dialog flows and leverages reasoning capabilities of the LLMs to drive decision making and orchestration. Moreover, the LLM-based digital assistant provides out-of-the-box human-like conversation capabilities.

Figure 3:
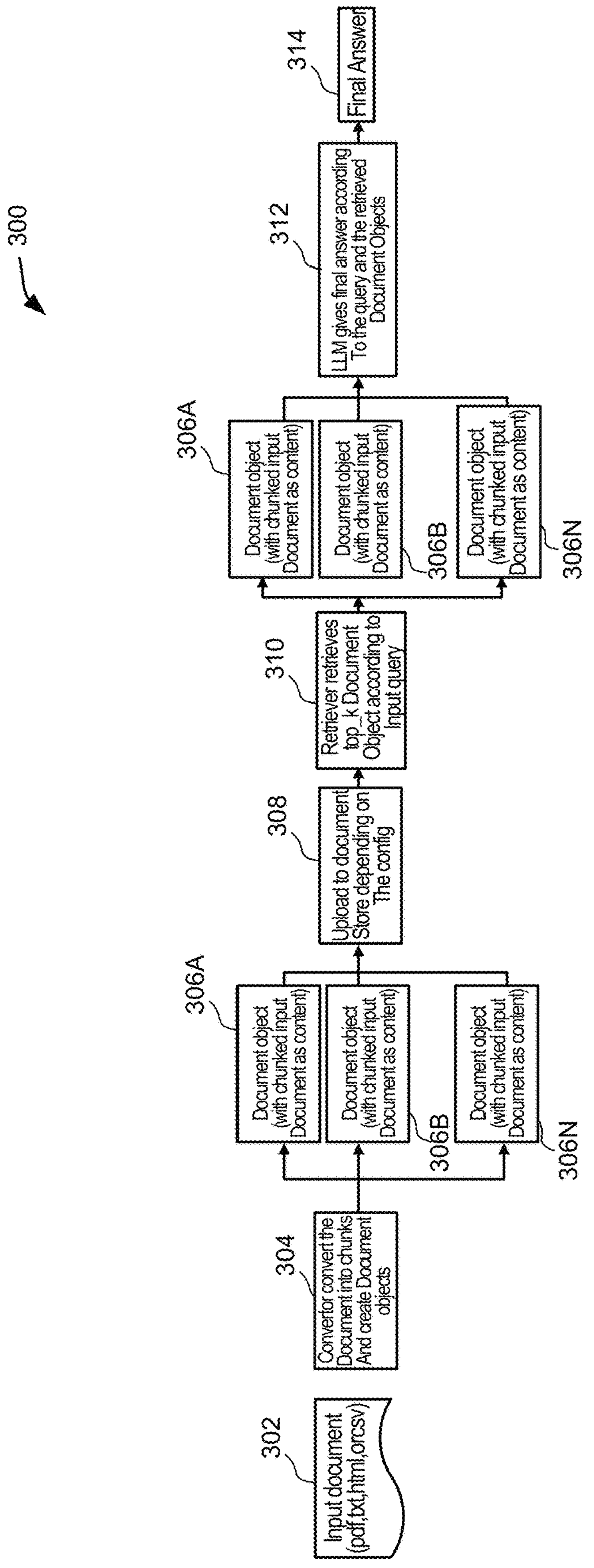
FIG. 3 illustrates an example process for using a custom knowledge base to answer an input query in accordance with various embodiments.

FIG. 3 shows an example process 300 for using a custom knowledge base to answer an input query, according to some embodiments. The process 300 can be performed by the systems described above with respect to FIGS. 1 and 2.

At step 302, an input document is accessed. The input document can be of various formats, such as pdf, txt, html, csv, or other suitable formats. The input document can be provided with a user query or at an initial time.

At step 304, a converter (e.g., the converter 207 in FIG. 2) converts the document into chunks and creates document objects. This results in document objects 306A, 306B, . . . 306N (which may collectively be referred to as document objects 306) with the chunks generated at step 304 as content.

At optional step 308, the document objects 306 are uploaded to a document store (e.g., the context and memory store 206 shown in FIG. 2). The document objects 306 can be used for a single session or uploaded to the document store for future use, depending on a configured selection.

At step 310, after receiving an input query, a retriever (e.g., the retriever 214A of FIG. 2) retrieves a subset of the document objects 306 according to the input query. In some implementations, the retriever ranks the document objects 306 and selects the top k highest ranked document objects 306 for retrieval, where k is a configurable number.

At step 312, after receiving the query and the retrieved document objects, an LLM (e.g., the response LLM 216B depicted in FIG. 2) generates and outputs a final answer according to the query and the retrieved document objects. The final answer or a derivative thereof is output at step 314.

Document Processing and Retrieval

A language model such as an LLM interprets a query by employing several mechanisms. Firstly, it breaks down the text into smaller units called tokens through a process known as tokenization. It then uses its pre-trained knowledge to understand the context of the query, analyzing the relationships between tokens and comprehending the semantics of the entire sentence. The LLM recognizes patterns in the query based on extensive data it has been trained on, which aids in understanding the user's intent and the specific information being sought. Additionally, the model parses the grammatical structure to understand the relationships between different parts of the query.

Despite the many advantages of leveraging an LLM to answer queries, there are also some limitations. Generally, an LLM cannot take documents like HTML, PDF, and other file types as input. The content needs to be parsed and converted into a format the LLM can parse easily. Further, LLMs tend to have a limited context window. It is not feasible to provide hundreds or thousands of documents as an input to the model and expect it to generate an answer. Thus, in various embodiments, the documents are divided into relatively small chunks. Using the chunks, limited and relevant content is provided to the LLM to help it generate an answer. Using chunks in this fashion helps the LLM to focus on pertinent details without being overwhelmed by excessive information. Moreover, these chunks need to be stored somewhere so that they can be accessed as needed and do not need to be recomputed. This storage solution adds another layer of complexity to the process, highlighting the intricate infrastructure required to effectively utilize LLM capabilities.

In some processing methods, different chunking strategies are applied to each document type. Unless handled carefully, this will result in inconsistent behavior for different document types. For example, a PDF file and a HTML file contains the same content, but due to the inconsistent chunking strategy, their final document chunks can be different after processing. As a result, the retrieval result on two document stores storing the two documents respectively can be inconsistent. To mitigate such drawbacks, in some embodiments, a unified chunking strategy is applied across all document types. Alternatively, or additionally, the documents are intelligently chunked according to document type.

To address the challenges associated with processing large volumes of diverse document types, in some embodiments, content is parsed from various document formats, which may include HTML, PDF, or other file types. After parsing, larger documents are chunked into smaller, more manageable sections. These chunks are then indexed into a semantic index, ensuring that they can be efficiently retrieved during runtime. This systematic indexing and chunking process is important as it prepares the data in a way that is accessible and interpretable for the language model, facilitating the retrieval of relevant information when needed.

During runtime, the solution leverages the prepared semantic index to respond to user queries effectively. When an end user submits a query, the index is searched to find the most relevant chunks of text. These selected chunks are then forwarded to the language model, which processes them to generate a coherent and contextually appropriate answer. The retrieval of these chunks can be accomplished through various methods, such as using an embedding-based model for semantic matching or employing keyword searches that pinpoint domain-specific terms within the document chunks. These methods ensure that the system can accurately and efficiently retrieve the necessary information, thereby enabling the language model to produce precise answers based on the user's query.

Figure 4:
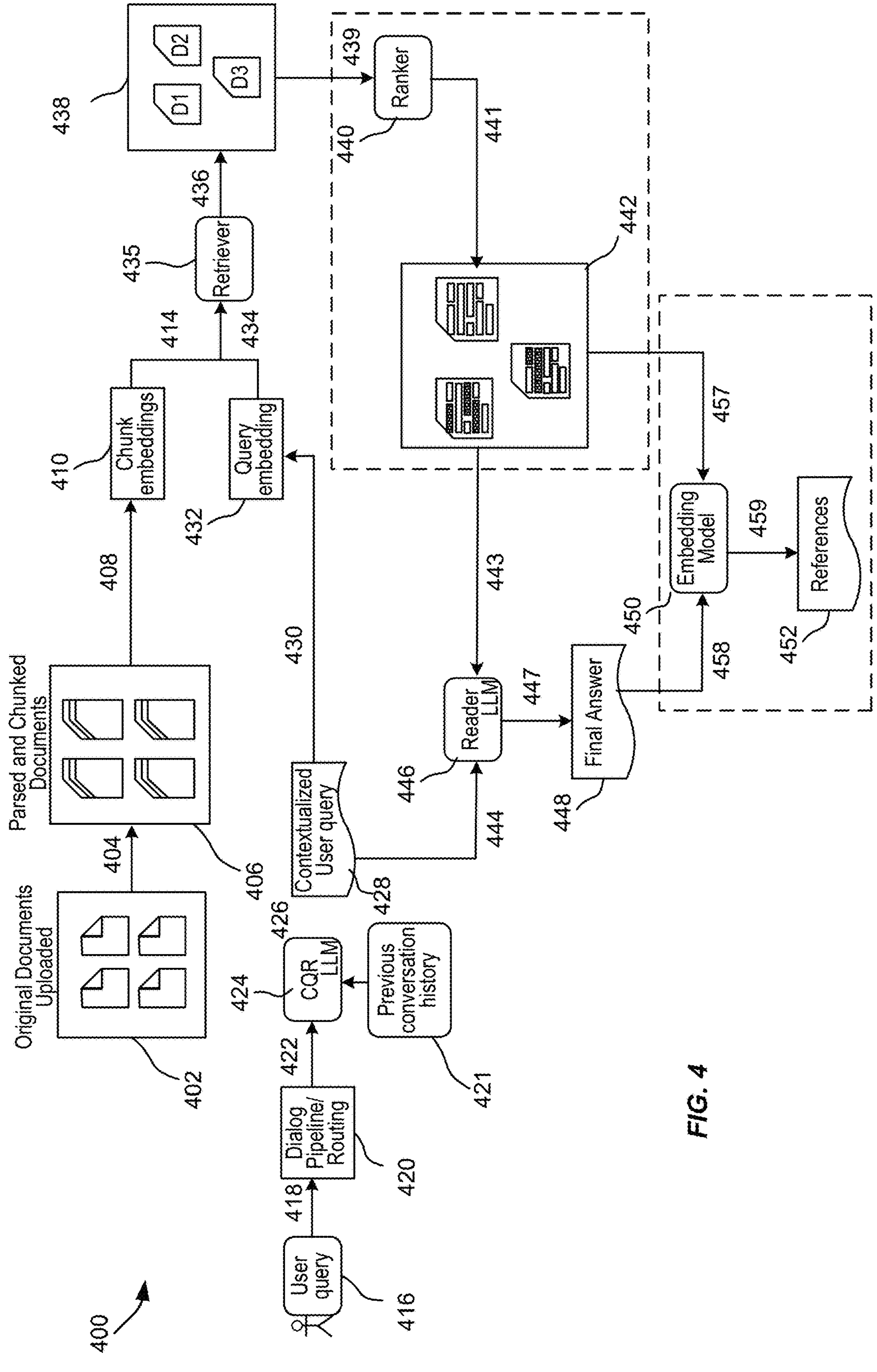
FIG. 4 illustrates an overview of an example architecture and process for document processing and retrieval for knowledge-based question answering in accordance with various embodiments.

FIG. 4 illustrates an overview of an example architecture and process 400 for document processing and retrieval techniques to be used when answering a query using a language model, in accordance with various embodiments. As shown in FIG. 4, a user can communicate with a system such as the computing system 200 described in FIG. 2, which can include a digital assistant 106 as described with respect to FIG. 1. Such a system can be configured for conversation-to-knowledge, or C2K, processing. As shown in FIG. 4, the example architecture includes a CQR model 424 (which may be similar to the CQR model 214C of FIG. 2), a reader LLM 446 (which may be similar to the response LLM 216B of FIG. 2), a retriever 435, an embedding model 450, and in some implementations a ranker 440.

At step 402, original documents are uploaded. As described above, various types of documents can be uploaded by a user to establish a customized knowledge base. At step 404, the documents are parsed and chunked to generate parsed and chunked documents 406. As described above, the documents can be stored as chunked objects of a smaller, configurable, size. At step 408, the chunked objects are embedded to generate chunk embeddings 410.

Concurrently or at a later time, a user query 416 is received. The user query 416 is provided to the dialog pipeline and routed at step 420. In some instances, at step 422, the user query is provided to a CQR model 424. As described above with respect to FIG. 2, the CQR model 424 is a model such as an LLM that is configured to use previous conversation history 421 to add contextual information to a query when needed, generating a contextualized user query 428. At step 426, the CQR model outputs the contextualized user query 428. At step 430, the contextualized user query 428 is embedded to generate a query embedding 432.

At steps 414 and 434, the chunk embeddings 410 and the query embedding 432, respectively, are provided to the retriever 435. The retriever 435 retrieves, at step 436, a subset of the chunk embeddings 410 that are most similar to the query embedding 432. As shown in FIG. 4, the top n most similar document chunks 438 are retrieved. The retriever 435 may, for example, compare the embeddings via cosine similarity to identify the top n most similar document chunks 438. N is a configurable integer. The top n most similar document chunks 438 are in some embodiments passed directly to the reader LLM 446 at step 443, and to the embedding model 450 at step 457. In alternative embodiments, the top n most similar document chunks 438 are first re-ranked by the ranker 440 at optional steps 439-441.

At step 439, the retrieved top n document chunks 438 are provided as input to the ranker 440. At step 441, the ranker 440 splits the top n document chunks 438 into sentence groups and re-ranks the sentence groups, returning the top k most relevant sentence groups 442. K is a configurable integer. In some embodiments, the ranker 440 uses a different ranking mechanism than the retriever 435, such as a classifier-based approach.

At step 443, the top k most relevant sentence groups 442 (or top n most similar document chunks 438 if steps 439-441 are omitted) are provided to the reader LLM 446. The contextualized user query is also provided to the reader LLM at step 444. At step 447, the reader LLM 446 outputs a final answer 448 to the user query 416.

At optional steps 457-459, reference information is retrieved and output. At step 457, the top k most relevant sentence groups 442 (or top n most similar document chunks 438 if steps 439-441 are omitted) are provided to the embedding model 450. The final answer 448 is also provided to the embedding model 450 at step 458. The embedding model 450 analyzes the final answer 448 and top k most relevant sentence groups 442 (or top n most similar document chunks 438) and identifies portions of the sentence groups 442 and/or document chunks 438 that are most relevant to the final answer 448. At step 459, the embedding model 450 outputs references 452, which can be the identified portions of the sentence groups 442 and/or document chunks 438 or a derivative thereof. The references 452 may be provided as output with or otherwise in association with the final answer 448. These techniques for document processing and retrieval are now described in further detail with respect to FIG. 5.

Figure 5:
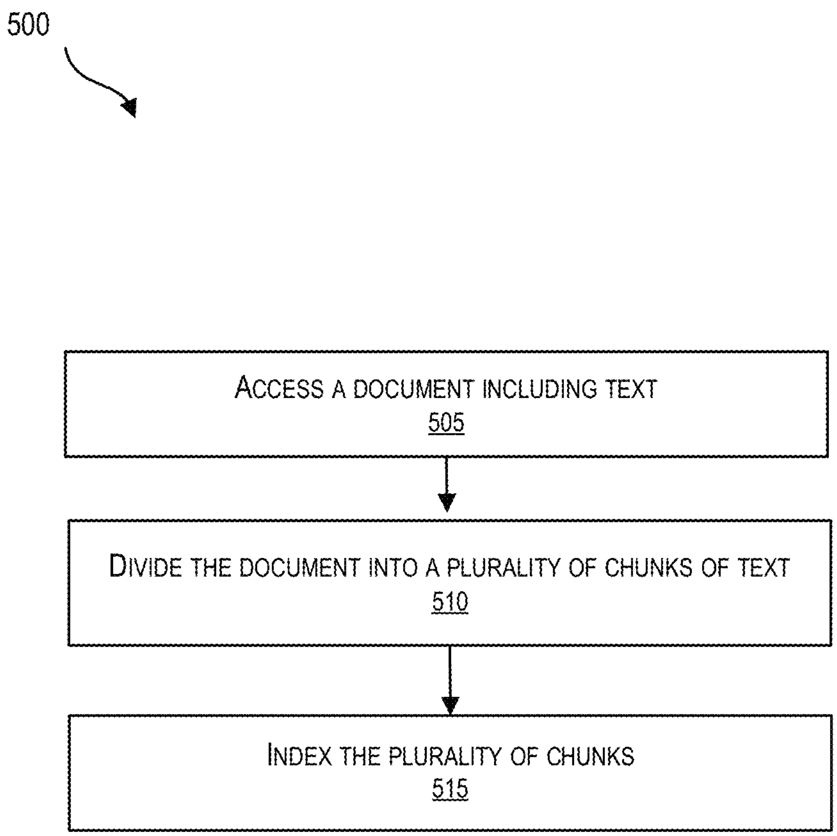
FIG. 5 is a flowchart of an example process for document processing for knowledge-based question answering in accordance with various embodiments.

FIG. 5 is a flowchart of an example process 500 for document processing for knowledge-based question answering, according to some embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIG. 5 depict the various processing steps occurring in a particular sequence or order, this is not intended to be limiting. In certain alternative embodiments, the steps may be performed in some different order or some steps may also be performed in parallel.

At step 505, a document is accessed. The document includes text. In some instances, a user uploads a document to the computing system, e.g., over a network connection from a remote user device. The documents are provided as knowledge to the computing system, e.g., to be used as context for responding to a user query. The document can be received with, or prior to, a related query. Alternatively, or additionally, a document is retrieved from local storage.

Various file types may be accepted as knowledge documents. For example, the document may be a text (TXT), portable document format (PDF), hypertext markup language (HTML), comma-separated values (CSV), or any other suitable document type.

At step 510, the document is divided into a plurality of chunks of text. In some aspects, the documents are processed in order to have a unified chunking strategy across all document types. For example, regardless of document type, the document is first parsed into one long string which is then chunked into smaller chunks of length M. M can be a user-configured or default value. In such cases, chunking is universal for multiple document types such as HTML, TXT and PDF.

Alternatively, or additionally, the chunking strategy is adaptive to the document type. For example, an intelligent chunking strategy conditioned on the document type is defined to ensure that the right context is captured within each chunk. As a specific example, for a document whose structure and/or sections are well defined, the computing system may chunk the document by section rather than breaking a chunk at a specific number of words. In some aspects, the computing system identifies a file type of the document and divides the document into the plurality of chunks according to the file type. In some aspects, the computing system includes a separate parser for each accepted file type. The document can be converted to one or more chunks in different ways based on the file type.

In some instances, the file type is portable document format (PDF). The dividing the document into the plurality of chunks includes parsing the document to identify data in the document and extract useful information from the document, which can include text, formatting information, metadata, etc. The text content is converted into sentence objects. In some examples, each sentence object contains the sentence, layout information, page numbers, and table identifiers. The computing system may store a chunk for each of these sentence objects.

In some instances, the file type is comma-separated values (CSV). The CSV document includes rows, columns, and cells. The dividing the document into the plurality of chunks includes appending a column header to each cell and converting each row to a document object. For example, the first row of the CSV file is expected to be a header row, and the rest of the rows are content rows. Each content row is converted by appending the column header to the cell and concatenating the columns. As a specific example, a CSV file has the following content:

| Question | Answer |
|---|---|
| This is question A. | This is answer A. |
| This is question B. | This is answer B. |
| This is question C. | This is answer C. |

The CSV file will be converted to the following chunks:

Document Object with content: "Question: This is question A. Answer: This is answer A."

Document Object with content: "Question: This is question B. Answer: This is answer B."

Document Object with content: "Question: This is question C. Answer: This is answer C."

In other words, each row of the CSV file will become a single document chunk and there will be no further chunking for individual cells.

In some instances, the file type is TXT. For TXT files, the chunking can include processing lines based on splitting notations in the TXT file. The computing system may concatenate lines and pages in the document. In some aspects, the TXT file is parsed into a single document object including the whole processed content. Alternatively, the TXT file is parsed into paragraphs. This can be based on a configured setting (e.g., a user can establish whether TXT files should be split by paragraph.

In some instances, the file type is HTML. HTML documents can be processed in a similar fashion to TXT documents. For example, the text is identified in the HTML document and established as a single document object. In other words, the whole HTML file becomes a single document object, and the plain text in the HTML is the content of the chunk.

In some cases, an initial chunk may be re-chunked, e.g., using fixed length chunking. For example, for an entire HTML file that was processed into a single large chunk, the large chunk is then divided into smaller chunks of length M, where M is an integer that can be configured by a user. In some aspects, all initial chunks are re-chunked to ensure consistency across document types.

At step 515, the plurality of chunks are indexed. The indexing includes storing each chunk mapped to respective identifying metadata, the identifying metadata including a chunk index for each chunk.

In some aspects, the chunks are embedded before indexing them. Embedding the chunks may include encoding the text making up the chunks into a vector representation. For example, the text chunks are provided as input to a sentence transformer model trained to output embeddings of the input text.

The chunks (e.g., the embedded chunks) are then indexed into an index (e.g., semantic index) and stored as searchable objects ("document objects") in a data store ensuring that they can be efficiently retrieved during runtime. In some examples, the indices are ordered, such that a first chunk that came after a second chunk in the original string has an index that is subsequent to the index of the second chunk. As a specific example, a passage in a document, "D1," states:

> This article explains the differences between older *Intermedia* Unite WebFax accounts and more modern *Intermedia* Unite WebFax accounts, and which fax-sending features are available in each. Fax Upload Application vs Online Fax. The Fax Upload Application is a Windows-based print driver that works in conjunction with older WebFax accounts and originally served as the only method available to send faxes from your computer. The Fax Upload Application has several current limitations, including functioning in North America only and working on Windows PCs only. The Fax Upload application will be eventually retired, but is still available and may be downloaded via the link above. The current Fax Upload Application version is 5.0.0. Additionally, all *Intermedia* Unite WebFax have the Online Fax feature. The Online Fax feature adds the ability to send faxes from any computer using a web browser. Online Fax was created as a more universal means of sending faxes from the WebFax product. It better supports different operating systems and regional support, and is intended to eventually replace the Fax Upload Application.

The document is broken into three chunks that are indexed as follows:

D1.C1: This article explains the differences between older *Intermedia* Unite WebFax accounts and more modern *Intermedia* Unite WebFax accounts, and which fax-sending features are available in each.

D1.C2: Fax Upload Application vs Online Fax. The Fax Upload Application is a Windows-based print driver that works in conjunction with older WebFax accounts and originally served as the only method available to send faxes from your computer. The Fax Upload Application has several current limitations, including functioning in North America only and working on Windows PCs only. The Fax Upload application will be eventually retired, but is still available and may be downloaded via the link above. The current Fax Upload Application version is 5.0.0.

D1.C3: Additionally, all *Intermedia* Unite WebFax have the Online Fax feature. The Online Fax feature adds the ability to send faxes from any computer using a web browser. Online Fax was created as a more universal means of sending faxes from the WebFax product. It better supports different operating systems and regional support, and is intended to eventually replace the Fax Upload Application.

The chunks are labeled at both the document (D1) and the chunk (C1, C2, C3) level. The chunk indexes are in order, so that C1 comes before C2, which in turn comes before C3, in the original passage.

Alternatively, or additionally, the indices for storing the documents are hierarchical. For example, larger documents may be split into smaller sections, which may be further split into chunks that are indexed. This can improve performance.

In some aspects, indexing the chunks includes storing metadata in association with the chunks. The metadata can include, for example, a chunk identifier (e.g., the chunk index described above). The chunks can be numbered consecutively so that chunks surrounding a given chunk can easily be identified and retrieved. As another example, the metadata can include a file name of the original file. Additional metadata that may be stored in association with each chunk includes a knowledge group that can organize groups of chunks by subject matter or customer to help streamline the chunk retrieval process. The indexed chunks can then be efficiently retrieved for question answering, as now described with respect to FIG. 6.

Figure 6:
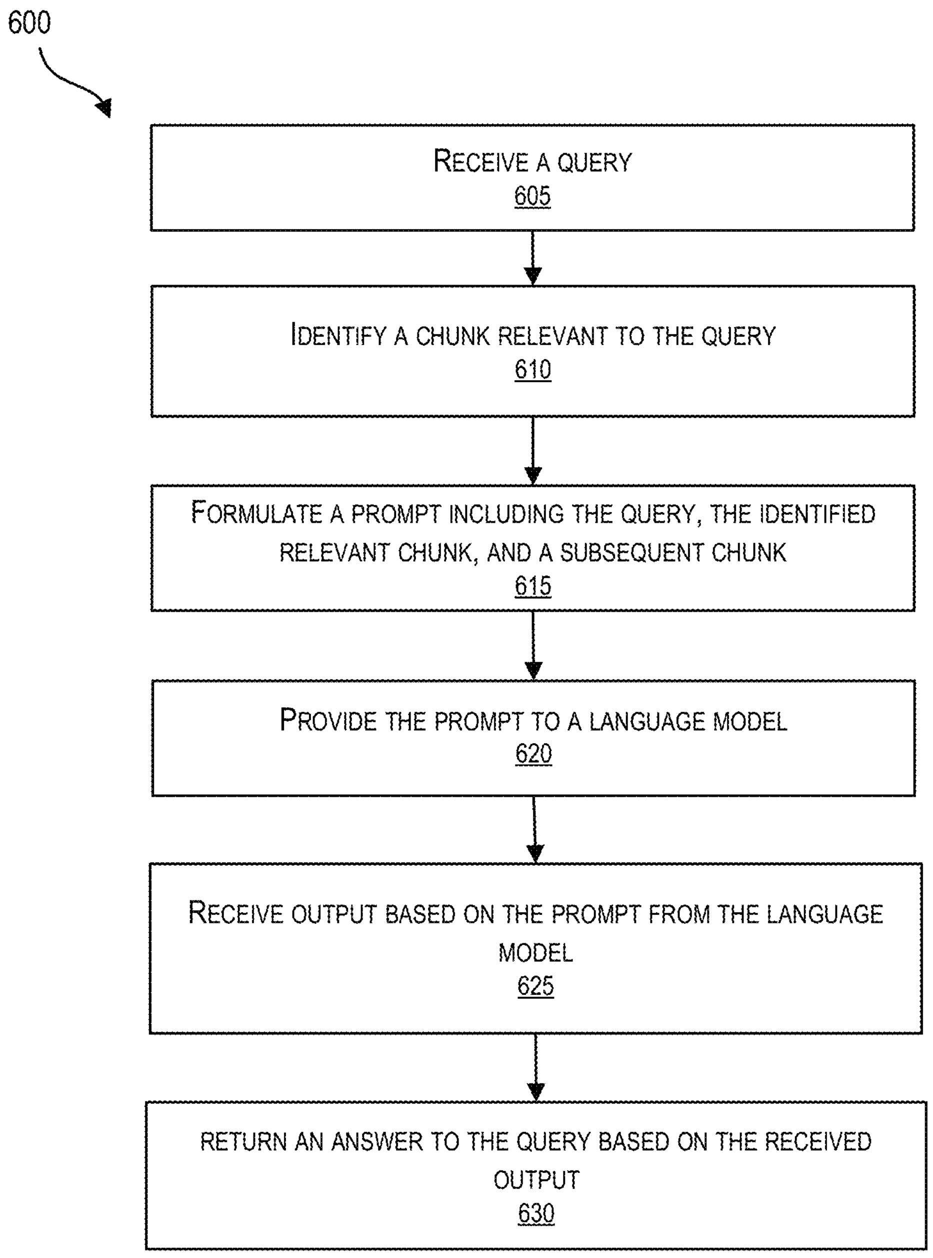
FIG. 6 is a flowchart of an example process for data retrieval for knowledge-based question answering in accordance with various embodiments.

FIG. 6 is a flowchart of an example process 600 for data retrieval for knowledge-based question answering, according to some embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIG. 5 depict the various processing steps occurring in a particular sequence or order, this is not intended to be limiting. In certain alternative embodiments, the steps may be performed in some different order or some steps may also be performed in parallel.

At step 605, a query is received. In some examples, the computing system receives the query from a user, as described above with respect to FIG. 4. For example, the computing system receives speech input from a user. The speech input may include one or more sentences. The computing system may receive the speech input, for example, via a speech input component such as a microphone of a user device or kiosk. In some aspects, the speech input component is part of a user device from which the speech input or a derivative thereof is transmitted to the computing system over a network. The speech input may be received as a wave form. The speech input may be in a particular language and be in a natural language query form. The speech input may specify a question that the user wants the computing system to answer and/or specify one or more actions that the user wants the computing system to initiate. The computing system may process the speech input to generate a text utterance. Alternatively, or additionally, the user input may be received in text form. For example, the user types in text during a chat with the computing system. The techniques described in this disclosure can be used with systems that receive input in the form of spoken speech, or text input, or combinations thereof.

The query may be received along with the document at step 505. Alternatively, or additionally, the document is provided first at step 505, and then the query is received at a later time.

In some aspects, the query is rewritten using a CQR model 424 as described above with respect to FIG. 4. The user query along with the previous conversation history is passed to the CQR model. The CQR model generates the fully contextualized query based on query and the previous conversation history.

At step 610, a chunk relevant to the query is identified. As described above with respect to FIG. 4, relevant chunks can be identified by comparing embeddings of the chunks to embeddings of the query by the retriever 435 and/or using the ranker 440 to provide the chunks and the query to a classifier model which outputs the relevant chunks.

As described above with respect to FIGS. 4 and 5, in some implementations, the chunks are embedded before storing and indexing them. When a query is received, it can be embedded in the same fashion (e.g., using the same embedding model). The computing system may access these stored embedded chunks for comparison to the query. In some examples, the computing system accesses the stored chunks by retrieving them from storage (e.g., the context and memory store 206 shown in FIG. 2). Alternatively, or additionally, the chunks can be stored as text passages and embedded after retrieval.

In some aspects, the metadata stored in association with the chunks can be used to speed up the retrieval process. Thousands or even millions of chunks may be stored, so it would be time-consuming to search every chunk stored. The chunk metadata can be used to search within a given knowledge group. For instance, in the user interface when initiating a query, the user can create or select a knowledge group, and the chunks are stored in association with a particular knowledge group. Then, the relevant knowledge group is searched rather than the entire knowledge base, which is much faster.

In some embodiments, the query embedding is compared to embedded text. The computing system (e.g., the retriever 435 of FIG. 4) compares each of the embeddings of the text passages to the query embedding to generate a similarity score for each of the embeddings of the text passages. The comparison may be performed using a suitable algorithm such as cosine similarity. For example, for each of the chunks, a similarity score is computed for each of the embeddings of the chunks based on cosine similarity to the to the query embedding.

One or more chunks that are most similar to the query are selected based on the comparison. The retriever 435 may select one or more chunks that are most similar to the query based on the similarity scores. For example, the retriever 435 selects a configured number of text passages having highest similarity scores. As described above, in some aspects, a user can select a parameter n that controls how many text passages are selected by the retriever 435. In some instances, the retriever retrieves the highest n ranked text passages. In some aspects, a user-configured number of text passages are selected. For example, n may be set to 10, 20, or another suitable number based on user preference. Alternatively, or additionally, n may be set to a default value in a similar range.

In some embodiments, as described above with respect to FIG. 4, an additional re-ranking of the chunks can be performed using the ranker 440. For example, the top n chunks are broken into sentences which are grouped into sentence groups. The sentence groups are compared to the query using another similarity score. For example, the query and each of the sentence groups is provided to a classifier model and a score is received for each of the identified sentences as output from the classifier model.

Based on the ranking (and potentially re-ranking), one or more chunks are selected. In some implementations, the chunks are selected by comparing the similarity score to a threshold value. The threshold value can be a default value or a user-configured value. For example, the threshold can be set to 0.25, or could be higher if the user wants higher confidence, or could be lower if the user wants to make sure an answer is generated even if some noisy information is output. Alternatively, or additionally, the chunk with a highest similarity score is identified as relevant to the query.

Alternatively, or additionally, composite retrieval methods may also be used to improve performance across various query types. For example, keyword-based search is applied for queries with domain-specific terms that may not be captured well via embeddings. Deterministic filtering may also be used in some cases. For example, documents are filtered by pre-defined topics, by date of the document, and so on. Metadata associated with a document can be used to further narrow down the pool. A combination of the above methods may be used for a composite retriever pipeline.

At step 615, a prompt including the query, the identified relevant chunk, and a subsequent chunk is formulated. In some examples, the subsequent chunk has a subsequent chunk index immediately following a chunk index of the identified relevant chunk. As noted above, in some aspects the chunks can be indexed in order, so that the next-indexed chunk corresponds to the text that came after the identified chunk in the original document. Alternatively, or additionally, the prompt can include the chunk that came before the identified chunk in the original document.

Accordingly, in addition to retrieving and passing the highest similarity chunks to the LLM for answer generation, the surrounding text for the matched chunks is also retrieved to ensure that important context information (that may be lost during chunking) is retrieved as best as possible.

In some aspects, this surrounding chunk addition is adaptive. Depending on the chunk type, surrounding context is handled differently. For example, when chunking a document with a known structure, surrounding context addition is tailored depending on the document section and which context is relevant for which section. This can be done via simply splitting into sections, summarizing larger text, and/or generating a list of questions that can be answered using the larger section of the document. In some aspects, a smallest chunk unit is retrieved, and a corresponding larger section is passed to the language model for maximum context retention.

In some aspects, the chunks are modified to account to a size limit for input to the language model. For example, the computing system identifies a size limit of a context input section for the language model. Some language models accept the query and the context in different sections with different limitations. The language model may have some maximum number of characters it can accept as context, for example. The computing system compares a size of the chunk and the subsequent chunk to the size limit. If the size of the chunks exceeds the size limits, the computing system resizes the size of the chunk and the subsequent chunk to be less than or equal to the size limit. For example, the computing system truncates words or sentences from the end of the pair of chunks to accommodate the size limit. In some aspects, the truncation is performed based on a number of tokens in the chunk. For example, the language model is associated with a tokenizer. The chunk is sent to the tokenizer, which is used to find the number of tokens in the chunk. This can be compared to the maximum token window size of the language model. Information can be cut after the threshold token number.

At step 620, the prompt is provided to a language model. In some examples, the language model is the response LLM 216B of FIG. 2. In some examples, as described above with respect to FIG. 2, the language model is an LLM that analyzes the query and contextual information from the chunked documents to generate a knowledge-based response.

At step 625, output based on the prompt is received from the language model. The output is responsive to the query and informed by the selected chunks that were provided to the language model at steps 615-620.

As an illustrative example, the following input is provided to the language model:

Query: Tell me more about Online Fax.

Context: D1.C2-C3: The Online Fax feature adds the ability to send faxes from any computer using a web browser. It better supports different operating systems and regional support, and is intended to eventually replace the Fax Upload Application.

D2.C1-C2: Online Fax allows you to send faxes from your WebFax Resource number via online interface in a browser. Additionally, all *Intermedia* Unite WebFax have the Online Fax feature. The Online Fax feature adds the ability to send faxes from any computer using a web browser. Online Fax was created as a more universal means of sending faxes from the WebFax product. It better supports different operating systems and regional support, and is intended to eventually replace the Fax Upload Application.

Based on the context and the contextual information from the chunked documents, the language model outputs the following response to the user query:

Online Fax is a feature that allows you to send faxes from any computer using a web browser. It was created as a more universal means of sending faxes from the WebFax product. It better supports different operating systems and regional support, and is intended to eventually replace the Fax Upload Application.

At step 630, an answer to the query is returned based on the received output. In some implementations, the language model output may be directly output as the answer to the query. Alternatively, or additionally, the computing system can augment the result with supplemental information such as reference information to reference documents, rephrasing, conversational additions, and/or the like. Returning the answer may include providing the answer to the user (e.g., by transmitting data to a remote user device). Returning the answer may be executed by preparing and outputting speech output. Alternatively, or additionally, the computing system may prepare a text response. In some implementations, the text response is converted to a spoken response using text-to-speech processing. The spoken response is then outputted as speech output via a speech output component such as a speaker. Alternatively, or additionally, a text response may be displayed to the user via a display component.

Alternatively, or additionally, the computing system may execute a task corresponding to the output of the language model. For example, the computing system may perform or cause performance of tasks such as placing a food order, booking a flight, retrieving information from a database, or the like.

Advantageously, the techniques described herein include segmenting knowledge documents into smaller, manageable chunks that can be retrieved based on a given user query. The chunks can then be used by a language model such as an LLM, such that the language model is only given the most relevant information for the query at hand. These segments help the language model focus on pertinent details without being overwhelmed by excessive information. Providing only relevant segmented knowledge to a language model significant value to the user by enhancing the relevancy and accuracy of the information provided to the user by the computing system. And, as noted above, the indexing methods described herein can significantly speed up data retrieval at runtime.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
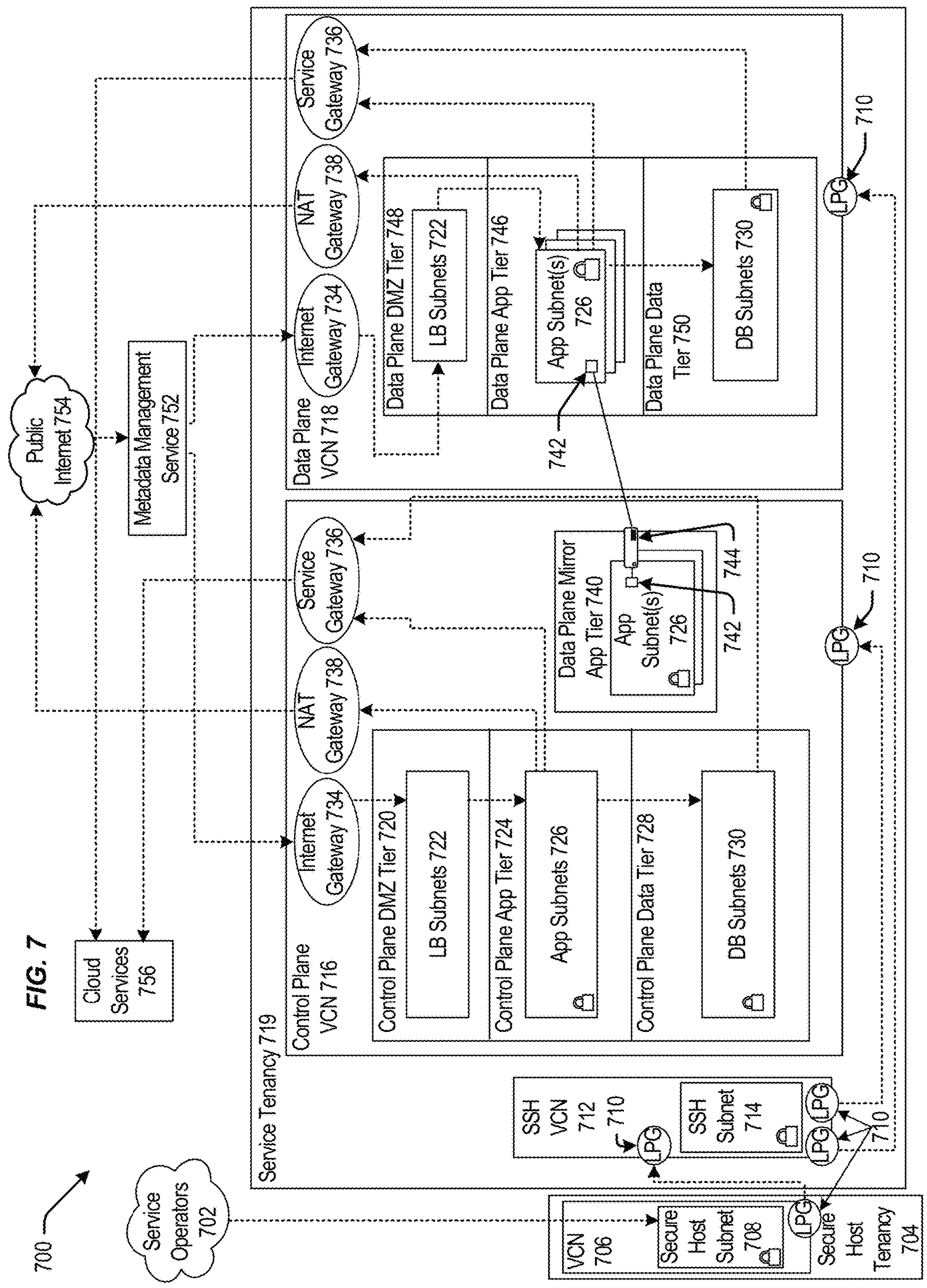
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
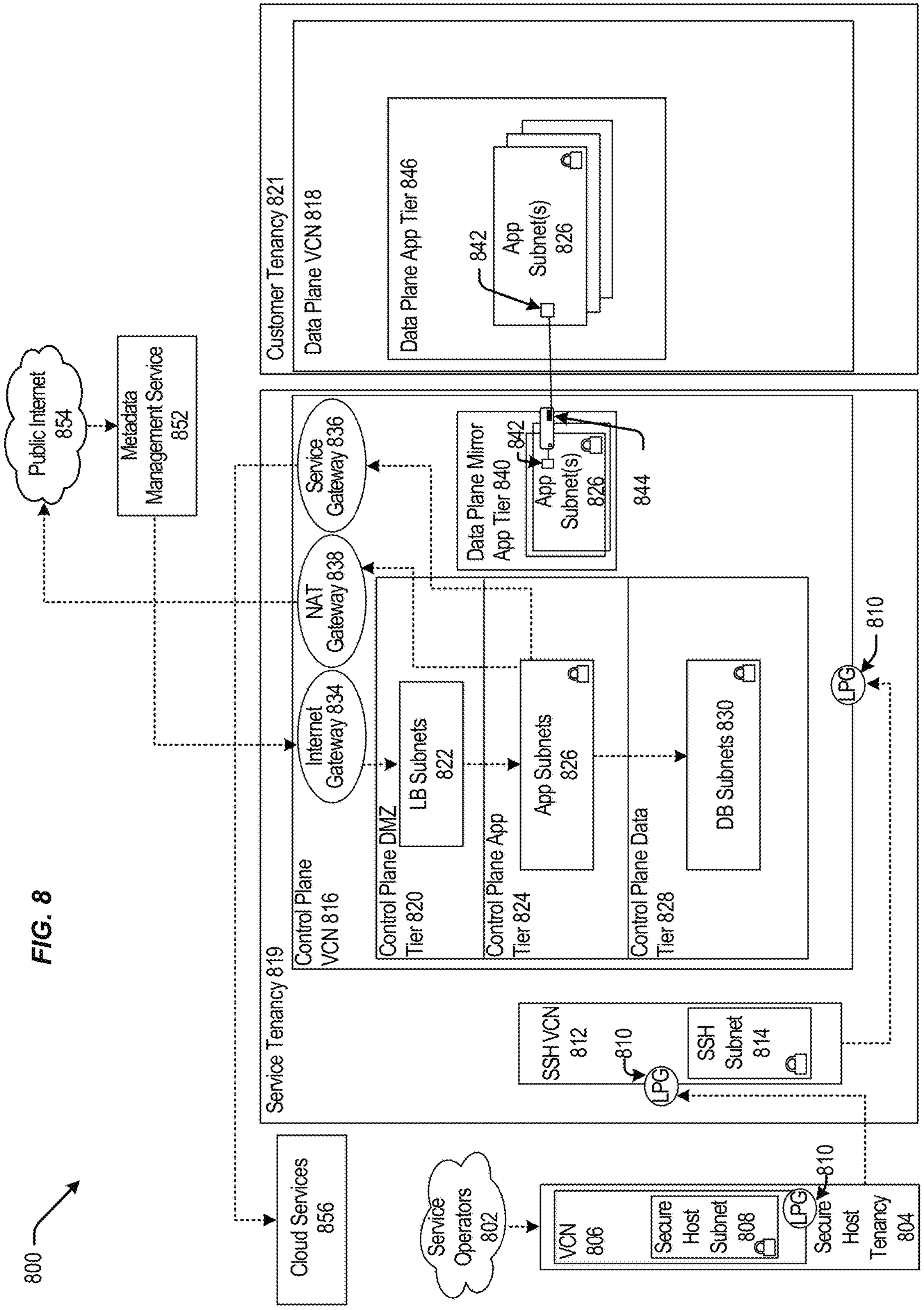
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
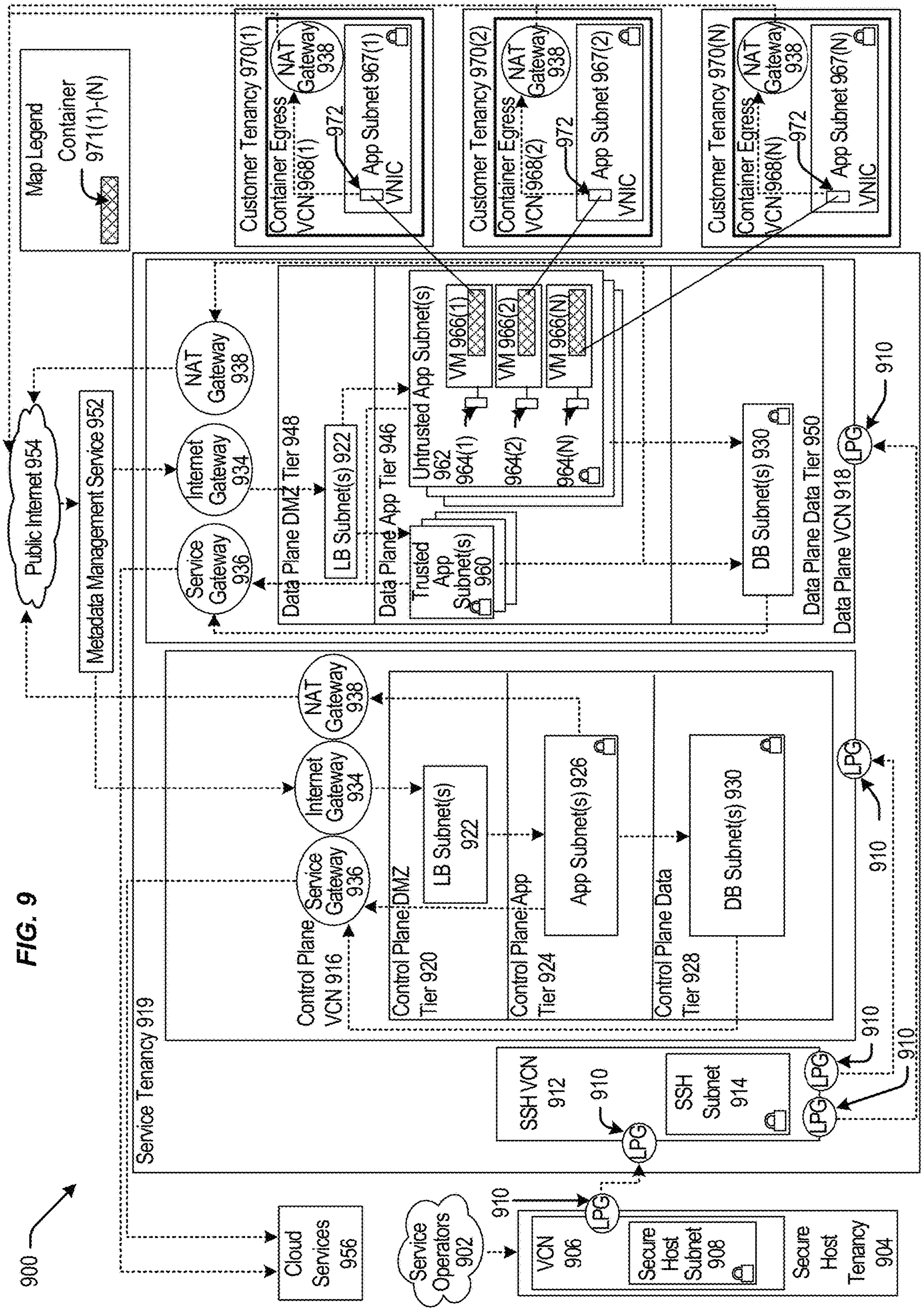
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
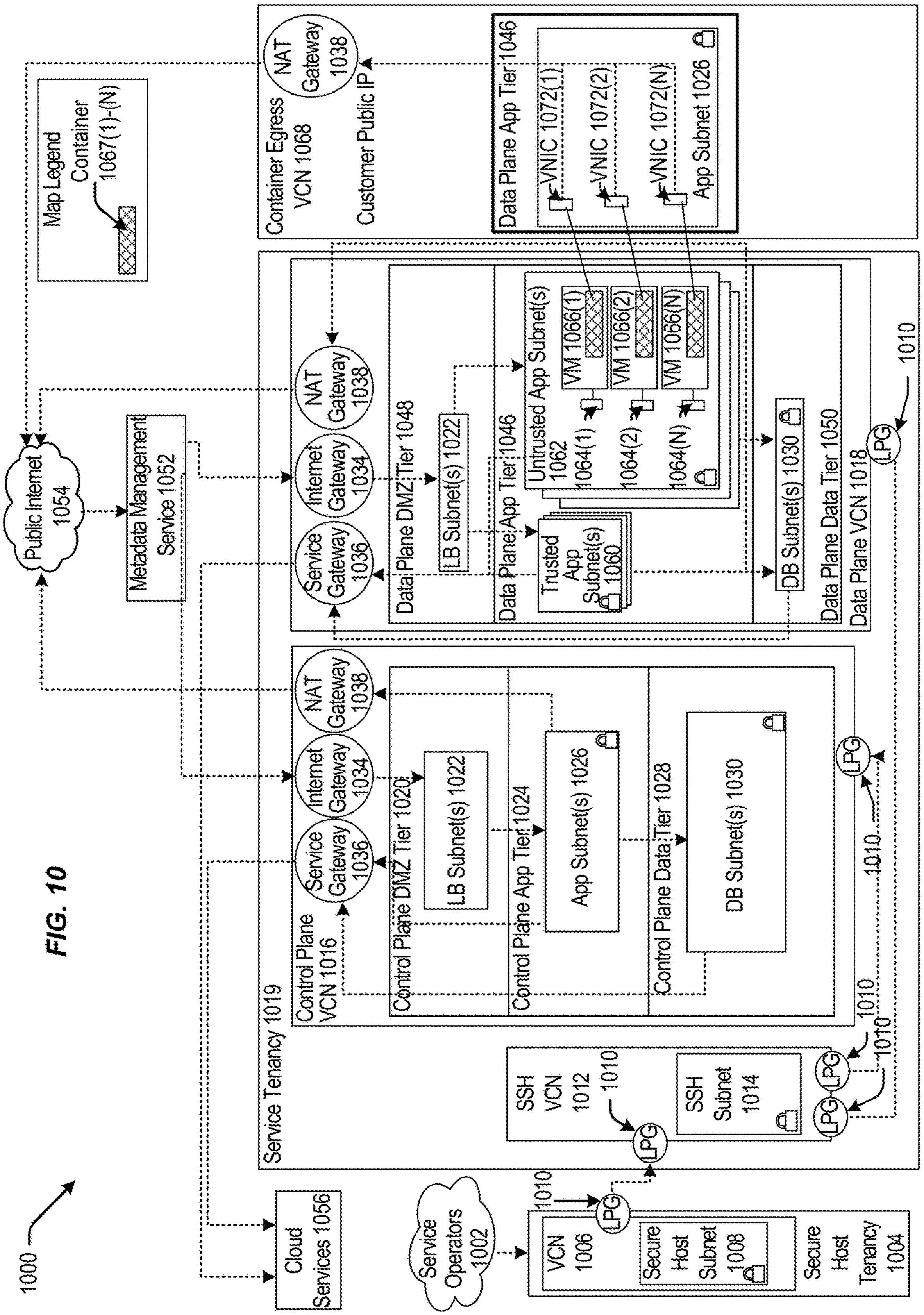
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
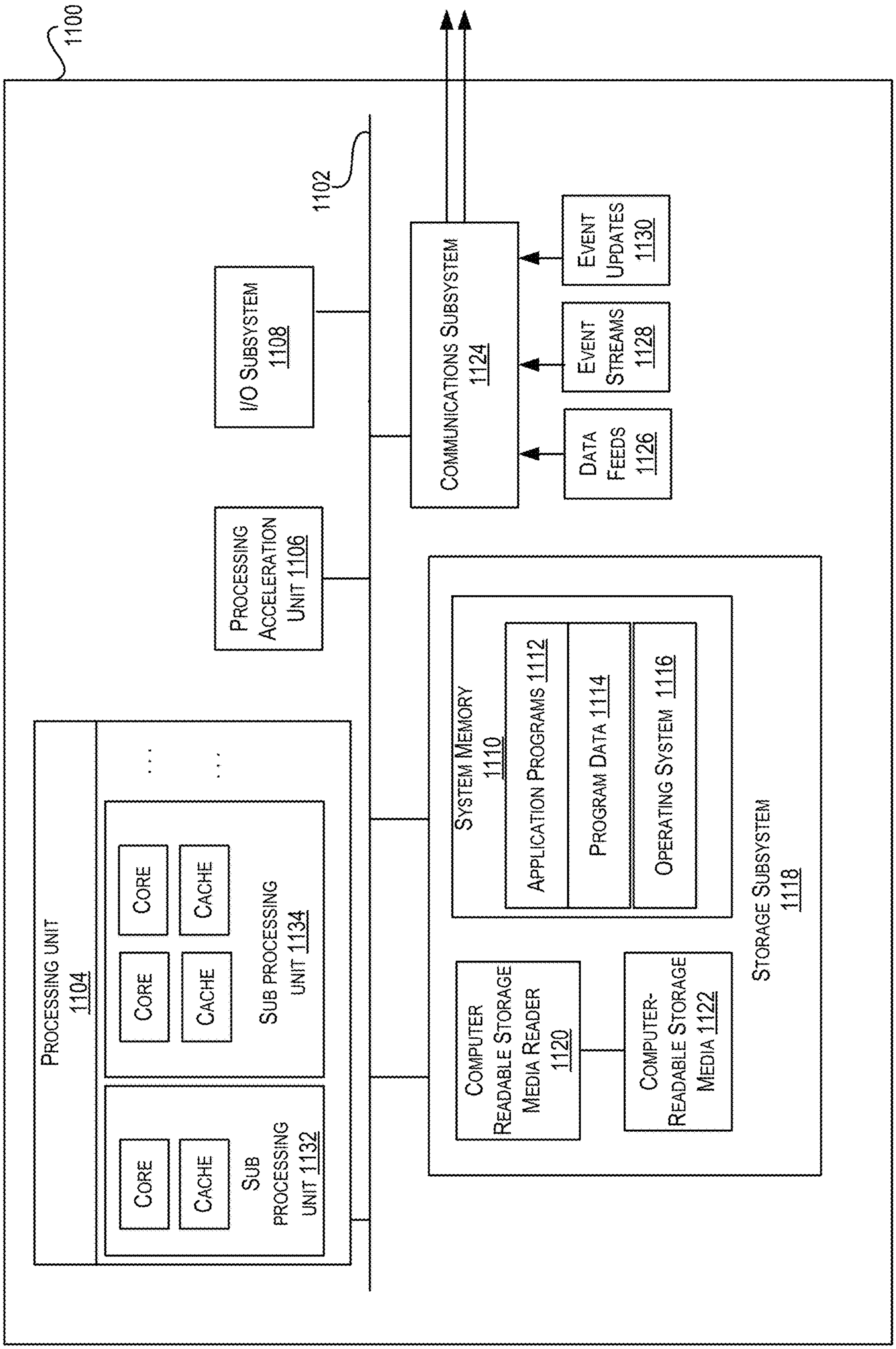
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing, by a computing system, a document, the document comprising text;

dividing, by the computing system, the document into a plurality of chunks of text;

indexing, by the computing system, the plurality of chunks, the indexing comprising storing each chunk mapped to respective identifying metadata, the identifying metadata including a chunk index for each chunk and a knowledge group of a plurality of knowledge groups for each chunk, each knowledge group indicating subject matter of a group of the plurality of chunks;

receiving, by the computing system via a graphical user interface (GUI), a query and an indication of a user-specified knowledge group;

analyzing, by the computing system, the query and the user-specified knowledge group to identify a subset of the chunks with subject matter similar to the query;

comparing, by the computing system, the subset of the chunks to the query to identify a chunk that is most similar to the query;

formulating, by the computing system, a prompt including the query, the identified chunk, and a subsequent chunk with a subsequent chunk index immediately following a chunk index of the identified chunk;

providing, by the computing system, the prompt to a language model, thereby causing the language model to generate a response to the query including information from the identified chunk;

receiving, by the computing system from the language model, the generated response; and returning, by the computing system, responsive to the received query, the generated response or a derivative thereof.

2. The computer-implemented method of claim 1, wherein identifying the identified chunk that is most similar to the query comprises:

embedding, by the computing system, a plurality of indexed chunks;

embedding, by the computing system, the query;

comparing, by the computing system, each of the plurality of chunk embeddings to the query embedding to generate a similarity score for each chunk embedding; and selecting the chunk with a highest similarity score.

3. The computer-implemented method of claim 2, wherein:

comparing the plurality of chunk embeddings to the query embedding comprises computing the similarity score for each chunk embedding based on cosine similarity.

4. The computer-implemented method of claim 1, further comprising:

identifying, by the computing system, a file type of the document; and dividing, by the computing system, the document into the plurality of chunks according to the file type.

5. The computer-implemented method of claim 4, wherein the file type is portable document format (PDF) and the dividing the document into the plurality of chunks comprises parsing the document into multiple sentence objects and storing a chunk for each sentence object.

6. The computer-implemented method of claim 4, wherein the file type is comma-separated values (CSV) comprising rows, columns, and cells, and the dividing the document into the plurality of chunks comprises appending a column header to each cell and converting each row to a chunk.

7. The computer-implemented method of claim 1, further comprising:

identifying a size limit of a context input section for the language model;

comparing a size of the identified chunk and the subsequent chunk to the size limit; and resizing the identified chunk and the subsequent chunk to have a size less than or equal to the size limit.

8. A system comprising:

one or more processors; and one or more computer-readable media storing instructions which, when executed by the one or more processors, cause the system to perform the following operations:

accessing a document, the document comprising text;

dividing the document into a plurality of chunks of text;

indexing the plurality of chunks, the indexing comprising storing each chunk mapped to respective identifying metadata, the identifying metadata including a chunk index for each chunk and a knowledge group of a plurality of knowledge groups for each chunk, each knowledge group indicating subject matter of a group of the plurality of chunks;

receiving a query and an indication of a user-specified knowledge group via a graphical user interface (GUI);

analyzing the query and the user-specified knowledge group to identify a subset of the chunks with subject matter similar to the query;

comparing the subset of the chunks to the query to identify a chunk that is most similar to the query;

formulating a prompt including the query, the identified chunk, and a subsequent chunk with a subsequent chunk index immediately following a chunk index of the identified chunk;

providing the prompt to a language model, thereby causing the language model to generate a response to the query including information from the identified chunk;

receiving, from the language model, the generated response; and returning, responsive to the received query, the generated response or a derivative thereof.

9. The system of claim 8, wherein identifying the identified chunk that is most similar to the query comprises:

embedding a plurality of indexed chunks;

embedding the query;

comparing each of the plurality of chunk embeddings to the query embedding to generate a similarity score for each chunk embedding; and selecting the chunk with a highest similarity score.

10. The system of claim 9, wherein:

comparing the plurality of chunk embeddings to the query embedding comprises computing the similarity score for each chunk embedding based on cosine similarity.

11. The system of claim 8, the operations further comprising:

identifying a file type of the document; and dividing the document into the plurality of chunks according to the file type.

12. The system of claim 11, wherein the file type is portable document format (PDF) and the dividing the document into the plurality of chunks comprises parsing the document into multiple sentence objects and storing a chunk for each sentence object.

13. The system of claim 11, wherein the file type is comma-separated values (CSV) comprising rows, columns, and cells, and the dividing the document into the plurality of chunks comprises appending a column header to each cell and converting each row to a chunk.

14. The system of claim 8, the operations further comprising:

identifying a size limit of a context input section for the language model;

comparing a size of the identified chunk and the subsequent chunk to the size limit; and resizing the identified chunk and the subsequent chunk to have a size less than or equal to the size limit.

15. One or more non-transitory computer-readable media storing instructions which, when executed by one or more processors, cause a system to perform the following operations:

accessing a document, the document comprising text;

dividing the document into a plurality of chunks of text;

indexing the plurality of chunks, the indexing comprising storing each chunk mapped to respective identifying metadata, the identifying metadata including a chunk index for each chunk and a knowledge group of a plurality of knowledge groups for each chunk, each knowledge group indicating subject matter of a group of the plurality of chunks;

receiving a query and an indication of a user-specified knowledge group via a graphical user interface (GUI);

analyzing the query and the user-specified knowledge group to identify a subset of the chunks with subject matter similar to the query;

comparing the subset of the chunks to the query to identify a chunk that is most similar to the query;

formulating a prompt including the query, the identified chunk, and a subsequent chunk with a subsequent chunk index immediately following a chunk index of the identified chunk;

providing the prompt to a language model, thereby causing the language model to generate a response to the query including information from the identified chunk;

receiving, from the language model, the generated response; and returning, responsive to the received query, the generated response or a derivative thereof.

16. The one or more non-transitory computer-readable media of claim 15, wherein identifying the identified chunk that is most similar to the query comprises:

embedding a plurality of indexed chunks;

embedding the query;

comparing each of the plurality of chunk embeddings to the query embedding to generate a similarity score for each chunk embedding; and selecting the chunk with a highest similarity score.

17. The one or more non-transitory computer-readable media of claim 16, wherein:

comparing the plurality of chunk embeddings to the query embedding comprises computing the similarity score for each chunk embedding based on cosine similarity.

18. The one or more non-transitory computer-readable media of claim 15, the operations further comprising:

identifying a file type of the document; and dividing the document into the plurality of chunks according to the file type.

19. The one or more non-transitory computer-readable media of claim 18, wherein the file type is portable document format (PDF) and the dividing the document into the plurality of chunks comprises parsing the document into multiple sentence objects and storing a chunk for each sentence object.

20. The one or more non-transitory computer-readable media of claim 18, wherein the file type is comma-separated values (CSV) comprising rows, columns, and cells, and the dividing the document into the plurality of chunks comprises appending a column header to each cell and converting each row to a chunk.

* * * * *